United States Patent

McLain, Jr. et al.

[11] Patent Number: 5,854,930
[45] Date of Patent: Dec. 29, 1998

[54] SYSTEM, METHOD, AND COMPUTER PROGRAM PRODUCT FOR SCRIPT PROCESSING

[75] Inventors: John V. McLain, Jr., Colorado Springs, Colo.; Dale W. Harris, Jr., Richardson, Tex.

[73] Assignee: MCI Communications Corporations, Washington, D.C.

[21] Appl. No.: 774,651

[22] Filed: Dec. 30, 1996

[51] Int. Cl.$^6$ .................................................. G06F 9/44
[52] U.S. Cl. ...................... 395/705; 395/704; 395/708; 395/385; 395/386; 395/500; 395/183.08; 395/183.11; 395/183.22; 371/2.1; 371/20.1; 371/37.1; 370/241; 370/252; 379/10; 379/15; 379/29
[58] Field of Search .................................. 395/705, 708, 395/704, 500, 672–674, 677, 737, 739, 733, 182.02, 182.01, 183.08, 183.11, 183.19, 183.22, 200.61, 588, 384–386; 371/2.1, 20.1, 20.4, 25.1, 37.1, 68.1, 68.2; 370/241, 242, 244, 252; 379/1, 10, 12, 14, 15, 18, 29; 364/578

[56] References Cited

U.S. PATENT DOCUMENTS

| 4,455,602 | 6/1984 | Baxter, III et al. | 200/50.2 |
| 4,499,604 | 2/1985 | Clancy et al. | 395/800.42 |

(List continued on next page.)

OTHER PUBLICATIONS

Martin, J. et al., "*TCP/IP Networking: Architecture. Administration. and Programming.*" PTR Prentice Hall, Englewood Cliffs, NJ, pp. 6–8 (1994).

Minoli, D., "*Telecommunications Technology Handbook.*" Artech House: Norwood, MA, chapter 3, pp. 101–168 (1991).

Peterson, J. et al., "*Introduction.*" Operating System Concepts, Second Edition, Addison–Wesley Publishing, U.S.A., pp. 1–15 (1986).

Palmer et al., "*Restoration in a Patitioned Multi–Bandwith Cross–Connect Network,*" IEEE 1990 (pp. 81–85).

Tsukada et al., "The Multi–Project Support System Based on Multiplicity of Task," IEEE, 1994, pp. 358–363.

(List continued on next page.)

*Primary Examiner*—James P. Trammell
*Assistant Examiner*—Tuan Q. Dam

[57] ABSTRACT

A system, method, and computer program product is provided for script processing. A new script language and script processing is used to significantly reduce the number of lines required for a script. A script includes a global script segment associated with a script data segment. The global script segment includes global directives (automatic directives and script repeating directives). The script data segment includes command records. Automatic directives are interpreted and repeatedly executed until script processing is complete. Automatic directives can be selectively activated and de-activated by a user. Script repeating directives repeat processing of the script data segment until the script repeating directive is satisfied. A command record includes an operation name field identifying a particular command and one or more operand fields. The operand fields can include single values, a range of values, or substitution codes. The script processor automatically repeats processing the script for each command record in the script data segment. The script processor further interprets the syntax of an operand to determine whether an operand is a single value, range of values, pointer, or substitution code. For a single value, the script processor executes the operation using the single value. For a ranges of values, the script processor repeatedly executes the operation for each value in said range of values. For a pointer to a table or other range of values, the script processor repeatedly executes the operation for each value in the table or range of values pointed to by the pointer. For a substitution code, the script processor repeatedly executes the operation using a corresponding substitution value (e.g. data, time, or sequence number).

27 Claims, 8 Drawing Sheets

U.S. PATENT DOCUMENTS

| | | | |
|---|---|---|---|
| 4,552,297 | 11/1985 | Belanger et al. | 227/120 |
| 4,575,797 | 3/1986 | Gruner et al. | 395/385 |
| 4,636,948 | 1/1987 | Gdaniec et al. | 364/300 |
| 4,675,810 | 6/1987 | Gruner et al. | 711/202 |
| 4,737,985 | 4/1988 | De Luca et al. | 379/327 |
| 4,799,251 | 1/1989 | Smith et al. | 379/1 |
| 4,924,493 | 5/1990 | Dang et al. | 379/94 |
| 5,005,197 | 4/1991 | Parsons et al. | 379/210 |
| 5,008,812 | 4/1991 | Bhandarker et al. | 364/200 |
| 5,027,343 | 6/1991 | Chan et al. | 370/250 |
| 5,095,505 | 3/1992 | Finucane et al. | 379/201 |
| 5,157,665 | 10/1992 | Fakhraie-Fard et al. | 371/20.1 |
| 5,170,362 | 12/1992 | Greenberg et al. | 364/550 |
| 5,187,740 | 2/1993 | Swaim et al. | 379/209 |
| 5,197,127 | 3/1993 | Waclawsky et al. | 395/200 |
| 5,222,120 | 6/1993 | McLeod et al. | 379/88 |
| 5,224,108 | 6/1993 | McDysan et al. | 370/522 |
| 5,226,041 | 7/1993 | Waclawsky et al. | 370/60 |
| 5,241,584 | 8/1993 | Hardy et al. | 379/67 |
| 5,276,440 | 1/1994 | Jolissaint et al. | 340/825.02 |
| 5,280,481 | 1/1994 | Chang et al. | 370/352 |
| 5,285,494 | 2/1994 | Sprecher et al. | 379/59 |
| 5,323,388 | 6/1994 | Chang et al. | 370/352 |
| 5,335,268 | 8/1994 | Kelly, Jr. et al. | 379/112 |
| 5,337,306 | 8/1994 | Hall | 370/249 |
| 5,343,461 | 8/1994 | Barton et al. | 370/249 |
| 5,355,405 | 10/1994 | Bernstein | 379/246 |
| 5,373,501 | 12/1994 | Roland | 370/250 |
| 5,375,126 | 12/1994 | Wallace | 370/20.1 |
| 5,375,159 | 12/1994 | Williams | 379/23 |
| 5,384,822 | 1/1995 | Brown et al. | 379/10 |
| 5,394,540 | 2/1995 | Barrington et al. | 395/500 |
| 5,396,616 | 3/1995 | Venable | 395/500 |
| 5,410,586 | 4/1995 | Davies | 379/14 |
| 5,414,858 | 5/1995 | Hoffman et al. | 395/725 |
| 5,435,003 | 7/1995 | Chng et al. | 395/575 |
| 5,438,528 | 8/1995 | Emerson et al. | 364/580 |
| 5,444,693 | 8/1995 | Arslan et al. | 370/221 |
| 5,448,739 | 9/1995 | Jacobson | 395/680 |
| 5,488,648 | 1/1996 | Womble | 375/13 |
| 5,490,272 | 2/1996 | Mathis et al. | 395/650 |
| 5,513,345 | 4/1996 | Sato et al. | 395/182.02 |
| 5,557,795 | 9/1996 | Venable | 395/650 |
| 5,563,930 | 10/1996 | Pester, III | 379/34 |
| 5,572,570 | 11/1996 | Kuenzig | 379/1 |
| 5,581,749 | 12/1996 | Hossain et al. | 707/10 |
| 5,594,792 | 1/1997 | Chouraki et al. | 379/269 |
| 5,600,632 | 2/1997 | Schulman | 370/252 |
| 5,636,345 | 6/1997 | Valdevit | 395/200.11 |
| 5,659,547 | 8/1997 | Scarr et al. | 395/182.02 |
| 5,745,767 | 4/1998 | Rosen et al. | 395/704 |
| 5,748,617 | 5/1998 | McLain, Jr. | 370/244 |

OTHER PUBLICATIONS

Date, C.J., *Database: A Primer*,Reading,1983, MA: Addison–Wesley Publishing Co., reprinted 1990, pp. xiii–xvii and 3–157.

Rodrigues, T., "Telecom Tool Can Model CPU Loading," *Electronic Engineering Times*, 11 Nov. 1996: 46.

Ciccone, J., "Emulation Assists ASIC Comm Design," *Electronic Engineering Times*, 11 Nov. 1996: 50.

Carlson, S. et al., "HDL Automation Targets Network Designs," *Electronic Engineering Times*, 11 Nov. 1996: 48.

Hailey, Kim, "Verilog–AMS Speeds Wireless Designs," *Electronic Engineering Times*, 11 Nov. 1996:57 & 94.

Sanghvi, C., "Cell Family aids ATM Chip Design," *Electronic Engineering Times*, 11 Nov. 1996: 63 & 88.

Rathje, T. et al., "CPU Formal Verification Receives a Boost," *Electronic Engineering Times*, 11 Nov. 1996: 56, 90 & 92.

Jung, H., "3–D Graphics IC Takes Emulation Role," *Electronic Engineering Times*, 11 Nov. 1996: 53 & 80.

Gregory, J. et al., "Applications Alter Chip Development," *Electronic Engineering Times*, 11 Nov. 1996: 68,78 & 84.

Goering, R., "EDA Tools," *Electronic Engineering Times*, 11 Nov. 1996: 41, 75 & 122.

Monsen, K., "MPEG–2 Core Changes the Design Flow," *Electronic Engineering Times*, 11 Nov. 1996: 64, 71, 73 & 122.

Thon, D., "Focus on Applications Drives Innovation," *Electronic Engineering Times*, 11 Nov. 1996: 42 & 82.

Terrill, R., "Megafunctions Optimize Telecom PLD," *Electronic Engineering Times*, 11 Nov. 1996: 61 & 77.

Advantages
Script Line Range Substitution

SEND Cross-Connect from <1-10> to <11-20>, [expected response] / 500

Fig. 5A

Existing Technology

SEND Cross-Connect from 1 to 11, [expected response] / 550
SEND Cross-Connect from 2 to 12, [expected response]
SEND Cross-Connect from 3 to 13, [expected response]
SEND Cross-Connect from 4 to 14, [expected response]
SEND Cross-Connect from 5 to 15, [expected response]
SEND Cross-Connect from 6 to 16, [expected response]
SEND Cross-Connect from 7 to 17, [expected response]
SEND Cross-Connect from 8 to 18, [expected response]
SEND Cross-Connect from 9 to 19, [expected response]
SEND Cross-Connect from 10 to 20, [expected response]

SYSTEM, METHOD, AND COMPUTER PROGRAM PRODUCT FOR SCRIPT PROCESSING

CROSS-REFERENCE TO RELATED APPLICATIONS

This patent application is related to the commonly-owned, co-pending U.S. utility patent application Ser. No. 08/641,460 titled "Method and Apparatus for Simulating Multi-Tasking", by John V. McLain, Jr., filed on May 1, 1996 and incorporated by reference herein; and to the commonly-owned, co-pending U.S. utility patent application Ser. No. 08/774,650, titled "System, Method and Computer Program Product for Digital Cross Connect Testing", by John V. McLain, Jr. et al., filed concurrently herewith and incorporated by reference herein.

BACKGROUND OF THE INVENTION

1. Field of the Invention

The present invention pertains to script languages and script processing.

2. Related Art Problem

Scripts are commonly used in database systems to generate various commands. In testing and computer simulation applications, for example, scripts represent test scenarios which can be run by a computer test tool. Scripts contain command records. To execute the script, a script processor interprets each command record in sequence.

Script processors support scripting languages by interpreting the commands in a script and executing corresponding operations. Scripting languages, such as, database languages, query languages, or other programming languages, utilize commands which support data management functions. In a typical database management system these functions include data definition, manipulation, and scrolling and formatting functions.

Accordingly, scripting languages, such as, Structured Query Language (SQL), have commands for defining a data structure (CREATE TABLE), manipulating data (SELECT, UPDATE), and scrolling and formatting (UP, DOWN, totaling). Go To and other script commands for jumping within a script have also been used.

In testing applications, a script includes command records defining a test scenario. Each command record includes a command name (such as SEND Cross-Connect) and operands (or values) to be operated on in carrying out the command. In this way, a command record identifies a "local" command within the script. A command record does not define "global" directives that operate on an entire script. A conventional script processor interprets a command record in a script and only performs the corresponding local command within the script.

To repeat the local command, a separate command record must be added to the script. Separate command records are required for each data value. Thus, scripts can get very long as each local command is repeated for each different value. GO TO and other conventional jumping commands can reduce the number of command records in a script. However, these jump statements are tied to specific lines in a script, making it difficult to create and edit scripts. For example, lengthy scripts with jump statements can be difficult to modify when a script syntax is changed in a new software release.

Further, conventional script processors do not automatically handle ranges of data values, separate tables of data values, or data substitutions.

What is needed is a script processor that can automatically perform repetitive operations without requiring separate command records to repeat each operation. A script processor is needed that can automatically perform repetitive operations without requiring GO TO or other jump-type command records to be expressly drafted in a script. A script processor is needed which automatically handles ranges of data values, separate tables of data values, or data substitutions in a script language. Such a script processor and script language is especially needed in applications where numerous, repetitive commands are used, such as, functional testing, stress testing, and stability testing.

SUMMARY OF THE INVENTION

The present invention provides a script processing system, method, and computer program product that can automatically perform repetitive operations without requiring separate command records to repeat each operation. According to the present invention, a script processor automatically performs repetitive operations without requiring GO TO or other jump-type command records to be expressly drafted in a script. A script processor automatically handles ranges of data values, separate tables of data values, or data substitutions. A single command record can have a global script directive (automatic or script repeating) that identifies a global function to be performed during script processing. A single command record can reference ranges of data values, separate tables of data values, or data substitutions. Multiple command records directed to each value are not needed.

In one preferred embodiment of the present invention, a script includes a global script segment associated with a script data segment. The global script segment includes at least one global directive and the script data segment includes at least one command record. A script processor reads each global directive in the global script segment, fetches the associated script data segment, and processes the script data segment based on each global directive that is read.

Two types of global directives are used, automatic directives and script repeating directives. A script processor interprets and performs an automatic directive until script processing is complete. Automatic directives can be selectively activated and de-activated through a user-interface during script processing. A script processor interprets a script repeating directive and repeats processing of the entire script data segment until the script repeating directive is satisfied.

A script data segment has one or more command records. Each command record includes an operation name field identifying a particular command and one or more operand fields. The operand fields can include single values, a range of values, or substitution codes. The script processor automatically repeats processing the script for each command record in the script data segment.

For each command record, the script processor reads the operation name and at least one operand and executes the named operation using data identified by each operand. The script processor interprets the syntax of an operand to determine whether the operand is a single value, range of values, pointer, or substitution code. When a single value is determined to be in an operand field, the script processor executes the operation using the single value. When a ranges of values is determined to be in an operand field, the script processor repeatedly executes the operation for each value in said range of values.

When a pointer to a table (or other data structure having a range of values) is determined to be in an operand field, the script processor repeatedly executes the operation for each table entry (e.g. each value in a table column). If a table entry has a range of values, the script processor repeats the command record operation for each value in the range of values before proceeding to the next table entry.

When a substitution code is determined to be in an operand field of a command record, the script processor repeatedly executes the operation named by the command record using a substitution value (e.g. data, time, or sequence number) corresponding to the substitution code. Likewise, if a table entry has a substitution code, the script processor repeats the command record operation using a substitution value before proceeding to the next table entry.

In a testing application, the automatic directive can include, but is not limited to, a dynamic send directive and a dynamic receive directive. Dynamic send and dynamic receive directives can be selectively activated and de-activated through a user-interface during script processing. The repeating directive can include, but is not limited to, a repeat directive and a channel directive.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIGS. 5A, 6A, and 7A each illustrate the number of command records needed in the present invention to send cross-connect commands for connecting a range of ports in an example DXC testing application.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

Script Processing

The present invention is described with respect to a computer database system environment. Description in these terms is provided for convenience only. It is not intended that the invention be limited to application in this example environment. In fact, after reading the following description, it will become apparent to a person skilled in the relevant art how to implement the invention in alternative environments.

Figure 1:
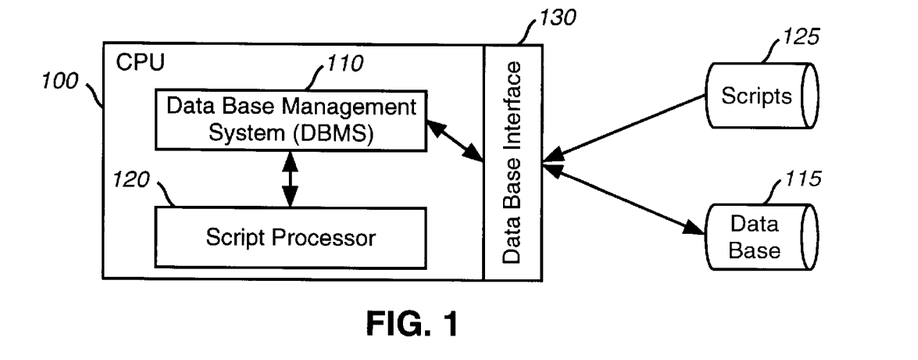
FIG. 1 is a block diagram of a computer database management system for processing a script according to the present invention.

FIG. 1 shows a general computer 100 that includes a database management system (DBMS) 110. DBMS 110 manages database 115 through database interface 130. Computer 100 can be any type of computer processor in any type of architecture (e.g., workstation, personal computer, host processor, and/or client/server network). DMBS 110 can be any type of database manager. Database 115 can be any type of database including, but not limited to, relational databases, non-relational databases, flat files, records, and other data storage forms. See, e.g., C. J. Date, *Database: A Primer* (Addison-Wesley Publishing Co. :U.S.A. 1983) (incorporated by reference herein).

According to the present invention, script processor 120 is included for processing one or more scripts 125. The operation of script processor 120 is described in detail with respect to script processing routine 400 in FIGS. 4A and 4B.

Figure 2:
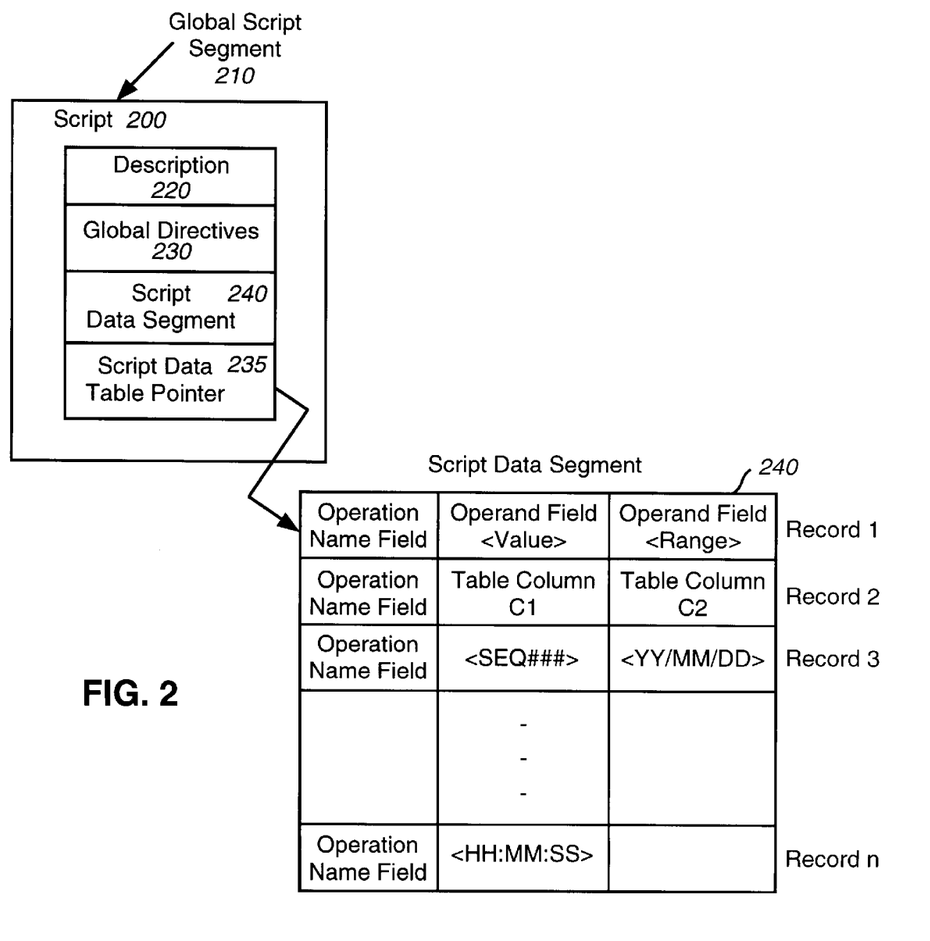
FIG. 2 is a schematic diagram of an example script according to the present invention.

FIG. 2 is a schematic diagram of a script 200 according to the present invention. Script 200 includes a global script segment 210 and a script data segment 240. Global script segment 210 includes a description 220, one or more global directives 230, and a script data table pointer 235. Description 220 includes text describing script 200. Global directives 230 can be either automatic directives and/or script repeating directives.

Script data table pointer 235 points to script data segment 240. In this way, the global script segment 210 need not include script data segment 240 and can be easily changed to run against other script data segments by changing the script data table pointer 235. Alternatively, a script data segment can be included directly in script 200, as indicated by script data segment 240'.

Script data segment 240 consists of n command records, where n is a whole number 0 to n. Each command record (1 to n) has a operation name field and one or more operand fields. The operation name field defines the operation that is to be performed using the operand fields. Each operand field can have a single value, range of values, table column pointer, or substitution code. Any combination of operand fields can be included in a single command record as appropriate for a given operation command.

In the example script data segment 240, Record 1 includes single value and range operands. Record 2 shows two table columns C1 and C2 used in respective operand fields. Record 3 shows two types of substitution codes, a sequence code and a date code, used in respective operand fields. Record n shows a time substitution code used in an operand field.

Figure 3:
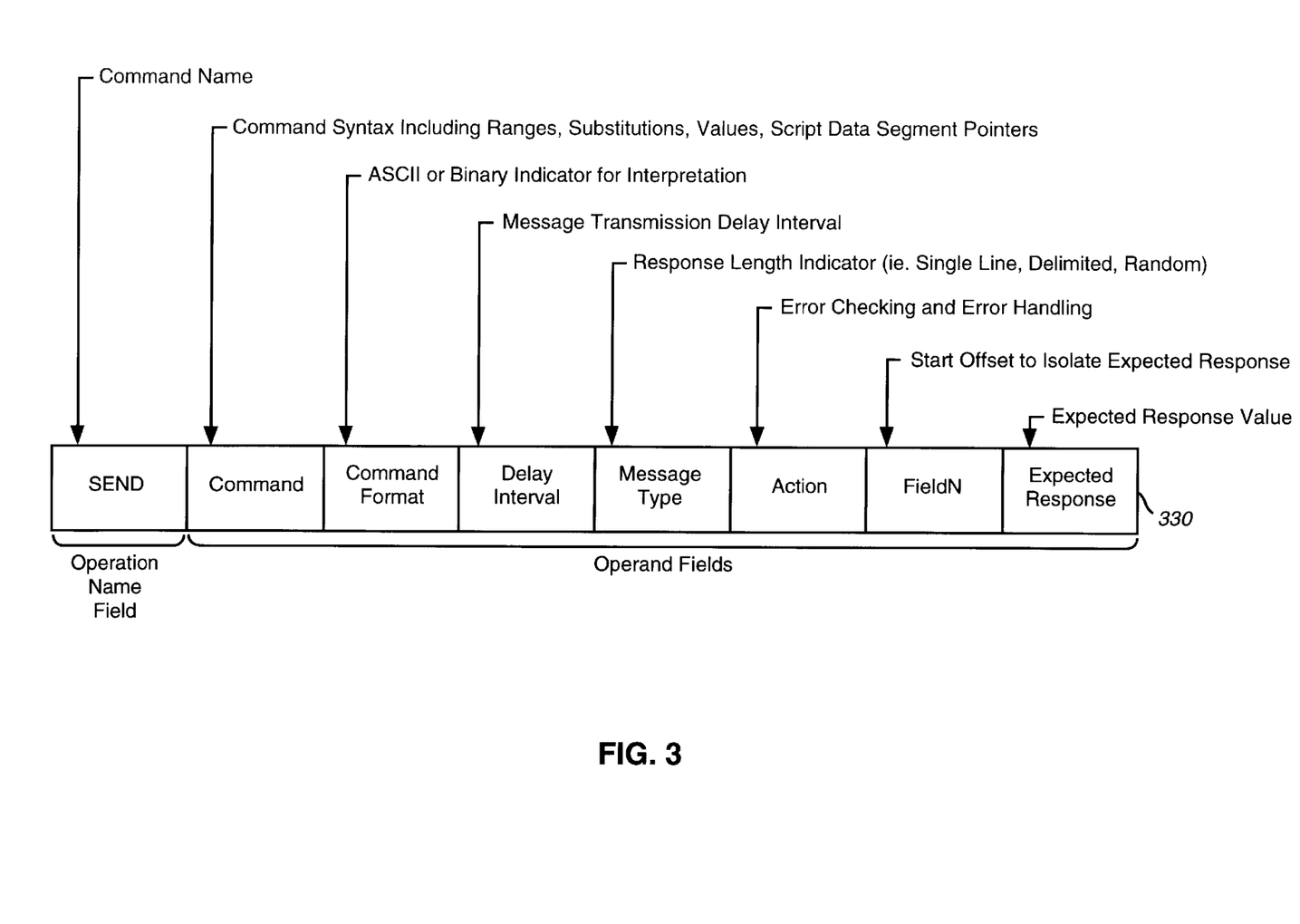
FIG. 3 shows an example command template that can be used in a script according to the present invention.

FIG. 3 shows an example SEND command template 300 as used for DXC testing. The SEND command template (or record) has an operation name field that includes a value representing a SEND command name. Seven operand fields are included: Command, Command Format, Delay Interval, Message Type, Action, FieldN, Expected Response. Command identifies DXC ports to be cross-connected. Command has a syntax interpreted by the script processor 120 to identify whether the value therein is a single value, range of values, substitution code, or script data segment pointer. Command Format is an ASCII or Binary Indicator.

Delay Interval sets a Message Transmission Delay Interval for flow control. Message Type is a Response Length Indicator (i.e., Single Line, Delimited, Random). Action is provided for error checking and error handling. FieldN denotes a start offset to isolate an Expected Response. Expected Response is the expected response value. This type of SEND command record is described in further detail in the above DXC Test Tool application incorporated by reference herein.

Figure 4A:
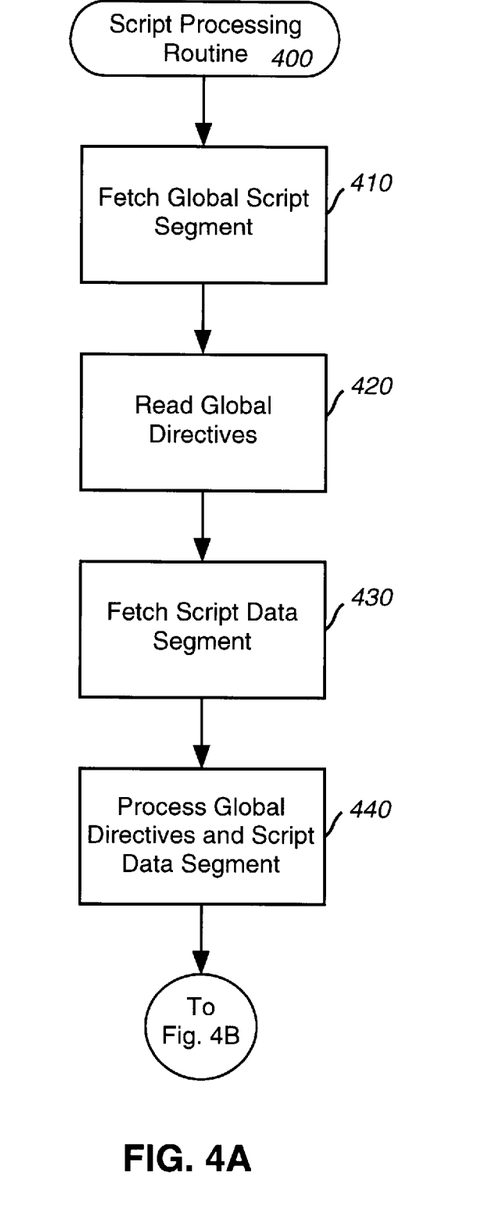
FIGS. 4A and 4B are a flowchart of a script processing routine according to the present invention.
Figure 4B:
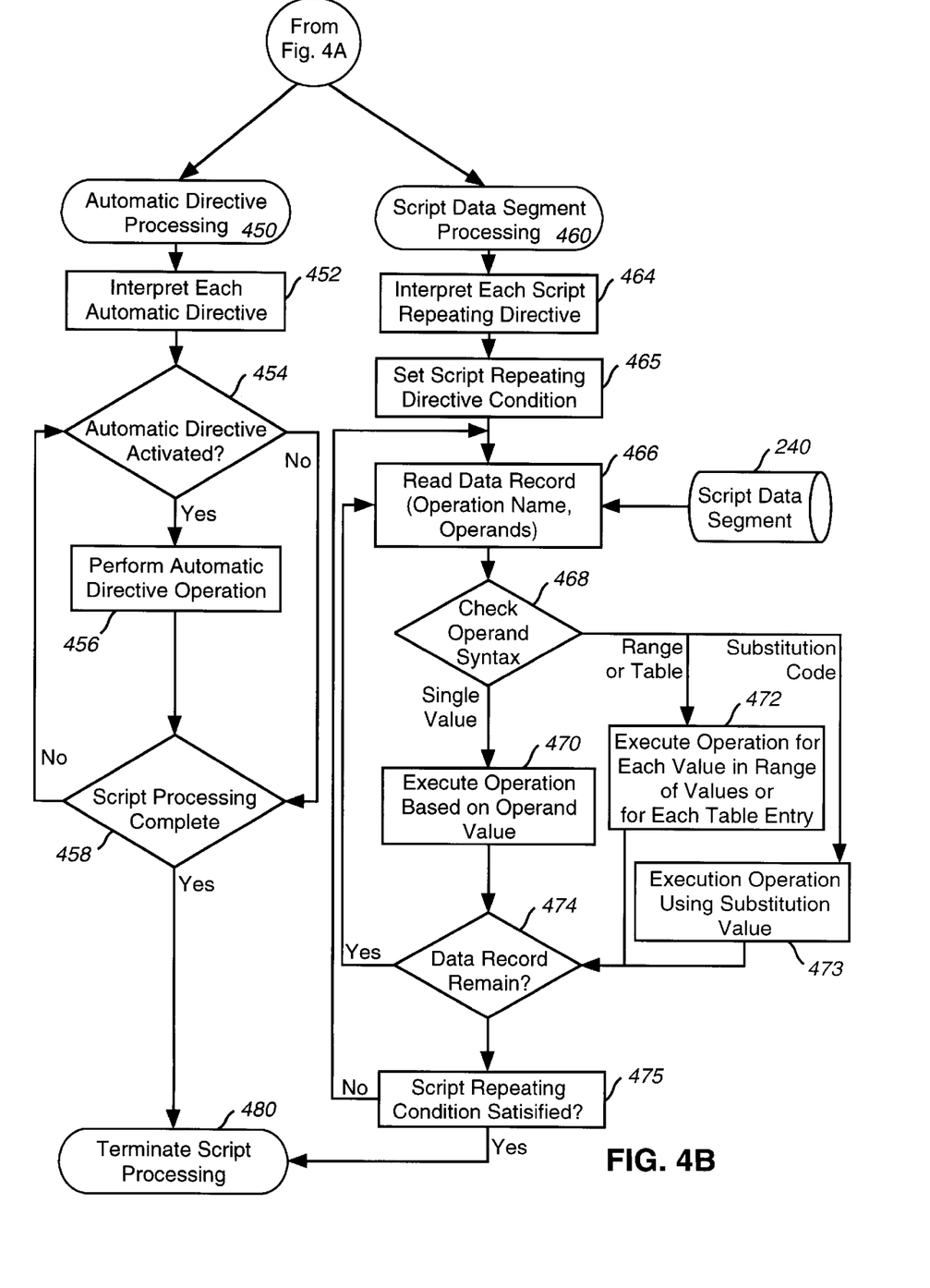

FIGS. 4A and 4B are a flowchart of a script processing routine 400 carried out by script processor 120 to read, interpret, and execute scripts 125. For clarity, script processing routine will be described with reference to the example script 200. In step 410, script processor 120 fetches global script segment 210. If desired, description 220 can be read and output through a user-interface for display (not shown).

Next, global directives 420 are read (step 420). Script data segment 240 is fetched (step 430). Finally, script processor 120 processes global directives and command records in the script data segment (step 440).

As shown in FIG. 4B, an automatic directive processing routine 450 is used to process automatic directives read in step 420. Script processor 120 interprets each automatic directive (step 452). In particular, script processor reads an operation name field identifying the particular automatic directive and any associated operand fields. In general, automatic directives can identify any operation to be performed by the script processor 120 or any application. For example, an automatic directive can include, but is not limited to, dynamic send and dynamic receive directives (DSEND, DRECEIVE) as described in the above DXC Test Tool application incorporated by reference herein.

A check is also made to determine whether an automatic directive is activated (step 454). If the automatic directive has been activated by a user or automatically set, the automatic directive operation is performed (step 456). In other words, script processor 120 interprets and executes the automatic directive (reads the directive operation name and performs a corresponding operation based on any associated operands). Script processor 120 repeats performing the automatic directive operation until processing of script 200 is complete (step 458) or no longer activated. The check in step 454 is an optional step that is provided to give a user control over processing of automatic directives, that is, to let a user turn them off.

Activation and deactivation is controlled through a user-interface (not shown) coupled to CPU 100. Any conventional user-interface can be used. For example, through a user-interface, script processor 120 can display a list of all automatic directives in a script and indicate whether each automatic directive has been activated or de-activated during script processing. A user can then selectively activate or de-activate individual automatic directives or groups of automatic directives through the user-interface during script processing. Note the automatic directive in a batch mode can be removed or controlled by conditional logic using separate command records or statement templates.

Script data segment processing routine 460 processes script repeating directives read in step 420 and the command records fetched in step 430. Script repeating directives have an operation name describing a script repeating operation and an operand specifying a corresponding script repeating condition at which point the script repeating operation is satisfied and ceased.

For example, a script repeating operation can identify that a script (at least script data segment 240) be repeatedly processed. The operand in the script repeating directive then specifies the number of times the script is to be repeatedly processed. A script repeating operation can also identify that a script (at least script data segment 240) be repeatedly processed using different substituted data values in each iteration. The operand in the script repeating directive then identifies the different data values to be substituted in each iteration. For example, a script repeating directive can include, but is not limited to, REPEAT and CHANNEL directives as described in the above DXC Test Tool application incorporated by reference herein.

Each script repeating directive is read and interpreted by script processor 120 (step 464). A script repeating condition is set (step 465). For example, a script repeating directive can have a condition number (e.g. 5) indicating the number of times that script processor 120 will repeat processing of script 200 (including script data segment 240).

Script processor 120 then reads and interprets a command record in script data segment 240 (step 466). A check is made on the syntax of each operand to identify whether the operand is a single value, range of values, table pointer, or substitution code (step 468).

For single value operands, script processor 120 executes an operation based on the single value (step 470). For a range of values or for a table of column entries, script processor 120 automatically executes the operation for each value in the range and for each column (or row) entry of the table pointed to by a table pointer (step 472). A range can also be included in a table column entry. Script processor 120 then executes the operation for each value in the range identified by the table column entry (step 472), before proceeding to read and process the next table column entry. For substitution codes, script processor 120 executes an operation based on a substituted value, e.g., date, time, or sequence number (step 473).

Routine 460 continues until no data records remain in script 200 (step 474) and the script repeating condition is satisfied (step 475). In other words, steps 466–474 are repeated for all n records until each script repeating directive is satisfied. Script processing is then terminated (step 480).

Routines 450 and 460 can be carried out by script processor 120 as soon as automatic and script repeating directives, respectively, are read in a script 200. Routines 450 and 460 can be performed substantially in parallel (through multi-tasking or simulated multi-tasking as described in the application incorporated by reference above) or in series.

Figure 5A:
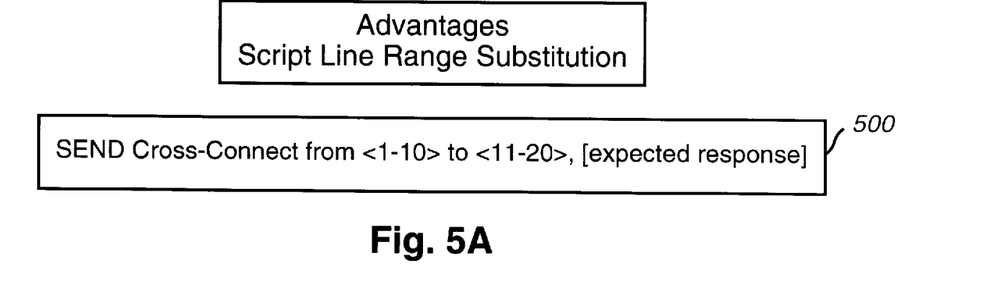
FIG. 5A shows an advantage of using a range in a script line according to the present invention.
Figure 5B:
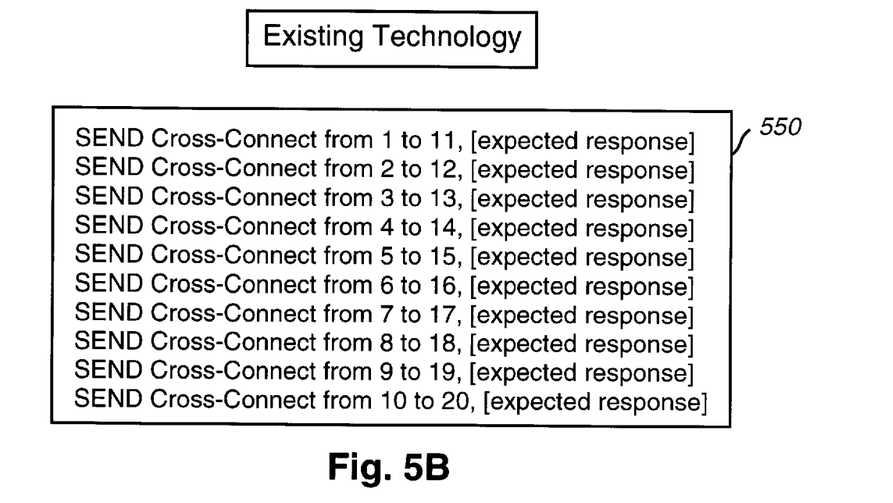
FIGS. 5B, 6B, and 7B each illustrate the number of command records needed in existing technology to send cross-connect commands for connecting a range of ports in an example DXC testing application.
Figure 6A:
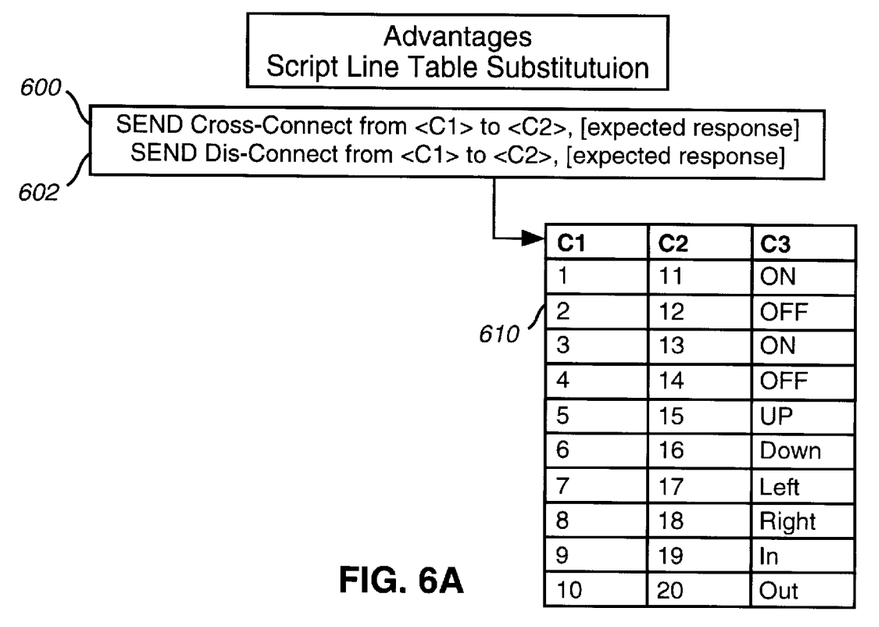
FIG. 6A shows an advantage of using a table in a script line according to the present invention.

Script processor 120 and routine 400 greatly reduce the number of records required in a script. FIGS. 5A, 6A, and 7A show the advantages of the present invention in reducing the number of lines in a script for generating multiple cross-connect and disconnect commands, compared to existing technology as shown in FIGS. 5B, 6B, and 7B, where one line is required for each send cross-connect and disconnect command between two ports.

FIG. 5A shows that using ranges (e.g. port ranges 1–10 and 11–20 marked by a syntax "<- >") in a script line according to the present invention, means only one send command record 500 (or script line) is needed rather than ten individual SEND commands 550. Script processor 120 will automatically repeat sending SEND cross-connect commands covering each range value (i.e. 1 to 11, 2 to 12, . . . 10 to 20).

Figure 6B:
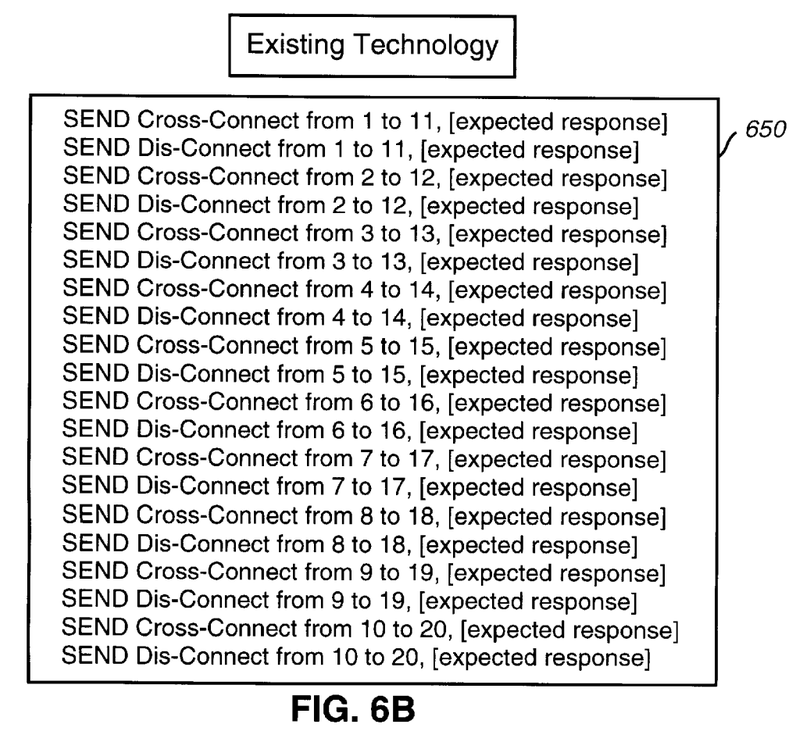
Figure 7A:
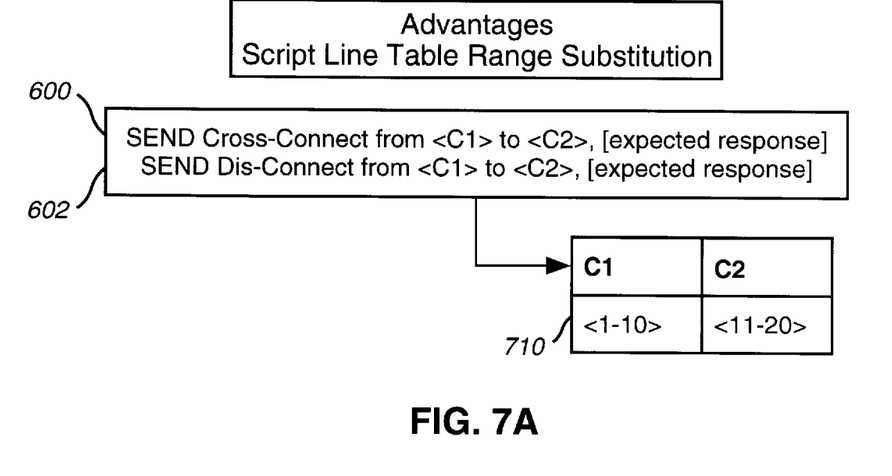
FIG. 7A shows an advantage of using a table in a script line, where the table has a column entry which is a range, according to the present invention.

FIG. 6A shows that using script lines having pointers to a table 610 (e.g. columns C1 and C2) in a script line according to the present invention, means only one send cross-connect command record 600 is needed, rather than ten individual SEND cross-connect commands 650 (FIG. 6B). Likewise, only one send disconnect command record 602 is needed, rather than ten individual SEND disconnect commands 650 (FIG. 6B). When interpreting command records 600 and 602, and table 610, script processor 120 will automatically send SEND cross-connect commands and SEND disconnect commands repetitively for each table column entry value (i.e. 1 to 11, 2 to 12, . . . 10 to 20).

Figure 7B:
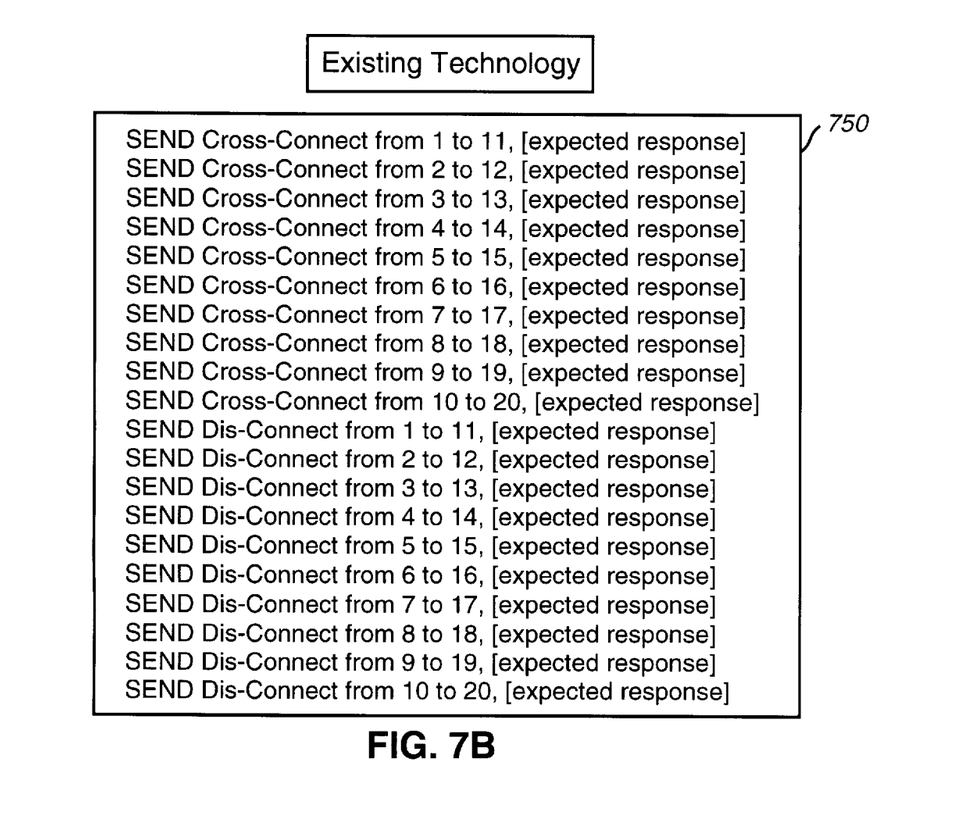

FIG. 7A further shows how the number of lines is further reduced for a table 710 by using ranges as entries in table columns C1, C2—compared to an equivalent 20 line script 750 in existing technology (FIG. 7B). When interpreting command record 600 and table 710, script processor 120 will automatically repeat sending SEND cross-connect commands covering each table column entry value (i.e. 1 to 11, 2 to 12, . . . 10 to 20). When interpreting command record 602 and table 710, script processor 120 will automatically repeat sending SEND disconnect commands covering each table column entry value (i.e. 1 to 11, 2 to 12, . . . 10 to 20).

Script processor 120 and the script processing routine 400 can be implemented primarily in software, hardware, and/or firmware, and any combination thereof. For example, script processor 120 can include any conventional read unit, fetch unit, and interpreter for reading, fetching, interpreting, and executing scripts according to the present invention as described above.

Figure 8:
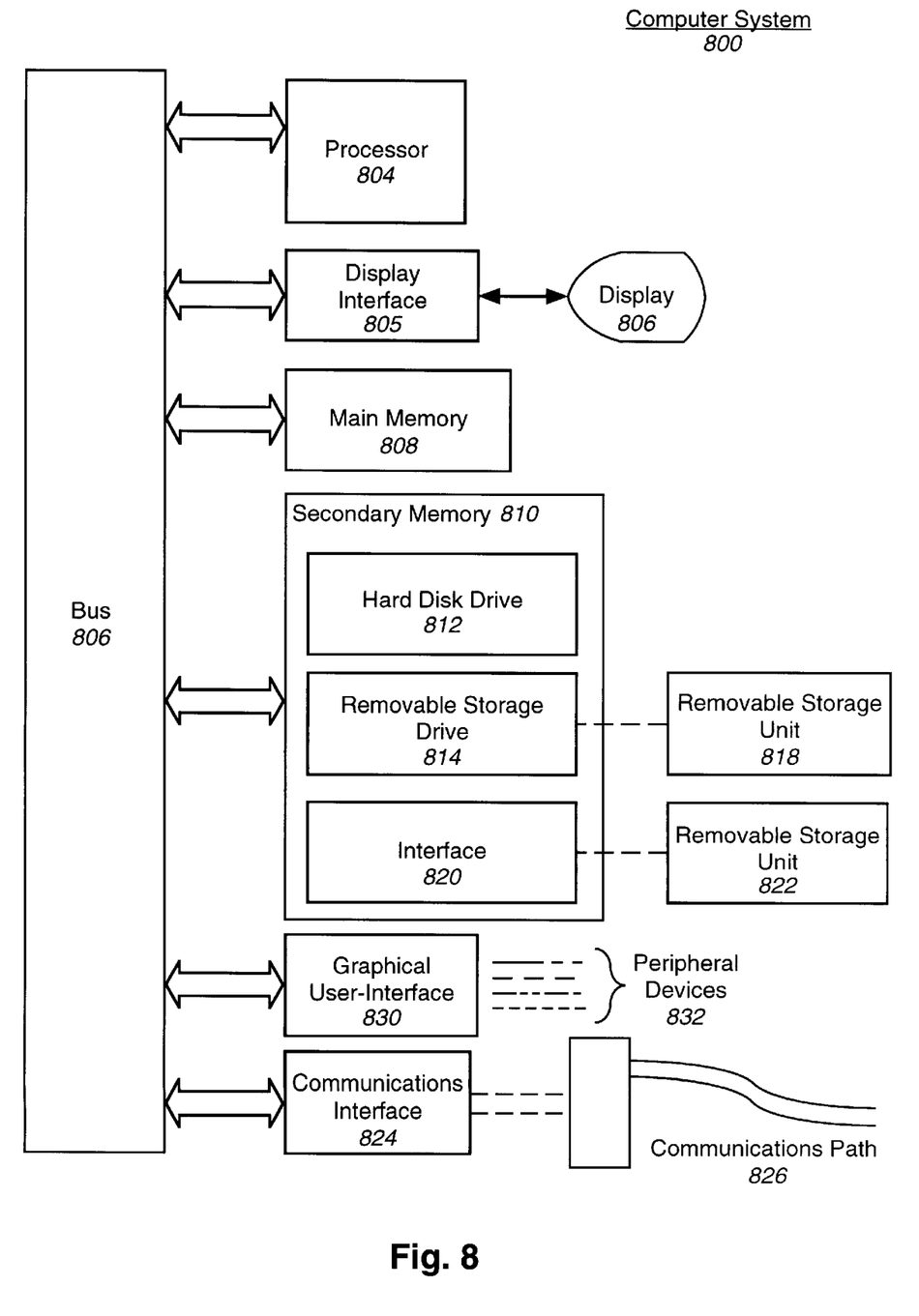
FIG. 8 is a block diagram of an example computer system for implementing a script processor according to the present invention.

FIG. 8 is a block diagram illustrating in more detail an example computer system 800 in which the present invention can operate. Computer system 800 includes one or more processors, such as processor 804. The processor 804 is connected to a communications bus 806.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, etc. Software and data transferred via communications interface 824 are in the form of signals which can be electronic, electromagnetic, optical or other signals capable of being received by communications interface 824, via communications path 826. Note that communications interface 824 provides a means by which computer system 800 can interface to a network, such as, the Internet.

An optional graphical user interface module 830 transfers user inputs from peripheral devices 832 to bus 806. These peripheral devices 832 can be a mouse, keyboard, touch screen, microphone, joystick, stylus, light pen, or any other type of peripheral unit.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above. In this document, the term "computer program product" is used to generally refer to removable storage device 818 or a hard disk installed in hard disk drive 812. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. Alternatively, the computer program product may be downloaded to computer system 800 over communications path 826. The control logic (software), when executed by the processor 804, causes the processor 804 to perform the functions of the invention as described herein.

Various software embodiments are described in terms of this example computer system. After reading this description, it will be apparent to a person skilled in the relevant art how to implement the invention using other computer systems and/or computer architectures.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for processing a script, the script includes at least one global script segment associated with a script data segment, the global script segment includes at least one global directive and the script data segment includes at least one command record, the method comprising the steps of:

reading each global directive in the global script segment included in script;

fetching the associated script data segment which includes the command record; and processing the script data segment based on each global directive read in said reading step.

2. The method of claim 1, wherein the at least one global directive can include at least one automatic directive; and said processing step comprises the steps of:

interpreting each automatic directive; and performing each automatic directive until script processing is complete.

3. The method of claim 1, wherein the at least one global directive can include at least one script repeating directive; and said processing step comprises the steps of:

interpreting each script repeating directive; and repeating processing of the script data segment until each script repeating directive is satisfied.

4. The method of claim 1, wherein the at least one global directive can include at least one of an automatic directive and a script repeating directive; and said processing step comprises the steps of:

interpreting each automatic directive;

interpreting each script repeating directive;

repeating processing of the script data segment until each interpreted script repeating directive is satisfied; and performing each interpreted automatic directive until said repeating script data segment processing step is complete.

5. The method of claim 4, wherein said repeating processing step comprises the steps of:

for each command record in the script data segment, reading an operation name identifying an operation and at least one operand identifying data operated upon by said operation; and executing said operation using said data identified by said at least one operand.

6. The method of claim 4, wherein said repeating processing step comprises the steps of:

for each command record in the script data segment, reading an operation name identifying an operation and at least one operand identifying data operated upon by said operation;

determining when said operand contains a single value; and executing said operation using said single value.

7. The method of claim 4, wherein said repeating processing step comprises the steps of:

for each command record in the script data segment, reading an operation name identifying an operation and at least one operand identifying data operated upon by said operation;

determining when said operand contains a range of values; and executing said operation for each value in said range of values.

8. The method of claim 4, wherein said repeating processing step comprises the steps of:

for each command record in the script data segment, reading an operation name identifying an operation and at least one operand identifying data operated upon by said operation;

determining when said operand contains a pointer to range of values; and executing said operation for each value in said range of values pointed to by said pointer.

9. The method of claim 8, wherein said pointer points to a table having entries including said range of values.

10. The method of claim 4, wherein said repeating processing step comprises the steps of:

for each command record in the script data segment, reading an operation name identifying an operation and at least one operand identifying data operated upon by said operation;

determining when said operand contains a substitution code; and executing said operation using a substitution value corresponding to said substitution code.

11. The method of claim 10, wherein said substitution code includes at least one of a data code, a time code, and a sequence code.

12. The method of claim 1, wherein the at least one global directive can include at least one automatic directive; and said processing step comprises the steps of:

interpreting and activating each automatic directive;

permitting a user to selectively de-activate each automatic directive; and performing each activated automatic directive until script processing is complete.

13. A script processor for processing a script stored in a memory, the script includes at least one global script segment associated with a script data segment, the global script segment includes at least one global directive and the script data segment includes at least one command record, the script processor comprising:

a read unit reading each global directive in the global script segment included in the script;

a fetch unit fetching the associated script data segment which includes the command record; and a processor processing the script data segment based on each global directive read by said read unit.

14. The system of claim 13, wherein the at least one global directive can include at least one of an automatic directive and a script repeating directive; and said processor further comprises:

an interpreter interpreting each automatic directive and each script repeating directive;

said interpreter repeats processing of the script data segment until each interpreted script repeating directive is satisfied, and performs each interpreted automatic directive until each repeated processing of the script data segment processing step is complete.

15. The method of claim 14, wherein, for each command record in the script data segment, said interpreter reads an operation name identifying an operation and at least one operand identifying data operated upon by said operation, and executes said operation using said data identified by said at least one operand.

16. The system of claim 14, wherein, for each command record in the script data segment, said interpreter reads an operation name identifying an operation and at least one operand identifying data operated upon by said operation, determines when said operand contains a single value, and executes said operation using said single value.

17. The system of claim 14, wherein, for each command record in the script data segment, said interpreter reads an operation name identifying an operation and at least one operand identifying data operated upon by said operation, determines when said operand contains a range of values, and executes said operation for each value in said range of values.

18. The system of claim 14, wherein, for each command record in the script data segment, said interpreter reads an operation name identifying an operation and at least one operand identifying data operated upon by said operation, determines when said operand contains a pointer to range of values, and executes said operation for each value in said range of values pointed to by said pointer.

19. The system of claim 18, wherein said pointer points to a table having entries including said range of values.

20. The system of claim 14, wherein, for each command record in the script data segment, said interpreter reads an operation name identifying an operation and at least one operand identifying data operated upon by said operation, determines when said operand contains a substitution code, and executes said operation using a substitution value corresponding to said substitution code.

21. The system of claim 20, wherein said substitution code includes at least one of a data code, a time code, and a sequence code.

22. The system of claim 13, wherein the at least one global directive can include at least one automatic directive; and said processor further comprises:

an interpreter that interprets and activates each automatic directive, wherein, said interpreter permits a user to selectively de-activate each automatic directive and performs each activated automatic directive until script processing is complete.

23. A script processor for processing a script, the script includes at least one global script segment associated with a script data segment, the global script segment includes at least one global directive and the script data segment includes at least one command record, the processor comprising:

means for reading each global directive in the global script segment included in the script;

means for fetching the associated script data segment which includes the command record; and means for processing the script data segment based on each global directive read in said reading step.

24. A computer program product comprising a computer useable medium having computer program logic recorded thereon for enabling a processor in a computer system to process a script, the script includes at least one global script segment associated with a script data segment, the global script segment includes at least one global directive and the script data segment includes at least one command record, said computer program logic comprising:

means for enabling the processor to read each global directive in the global script segment included in the script;

means for enabling the processor to fetch the associated script data segment which includes the command record; and means for enabling the processor to process the script data segment based on each global directive.

25. A method for processing a script, the script includes at least one global script segment associated with a script data segment, the global script segment includes at least one global directive and the script data segment includes at least one command record, the method comprising the steps of:

reading the script data segment which the command record; and processing the script data segment, said processing step comprising the steps of:
for each command record in the script data segment,
reading an operation name field identifying an operation to be performed during said processing step and at least one operand field identifying data operated upon by said operation field;
determining when said operand field contains a range of values; and
executing said operation for each value in said range of values.

26. A method for processing a script, the script includes at least one global script segment associated with a script data segment, the global script segment includes at least one global directive and the script data segment includes at least one command record, the method comprising the steps of:

reading the script data segment which includes the command record; and processing the script data segment, said processing step comprising the steps of:
for each command record in the script data segment,
reading an operation name identifying an operation field and at least one operand field identifying data operated upon by said operation field;
determining when said operand field contains a pointer to a range of values; and
executing said operation for each value in said range of values pointed to by said pointer.

27. A method for processing a script, the script includes at least one global script segment associated with a script data segment, the global script segment includes at least one global directive and the script data segment includes at least one command record, the method comprising the steps of:

reading the script data segment which includes the command record; and processing the script data segment, said processing step comprising the steps of:
for each command record in the script data segment,
reading an operation name identifying an operation field and at least one operand field identifying data operated upon by said operation field;
determining when said operand field contains a substitution code; and
executing said operation field using a substitution value corresponding to said substitution code.

* * * * *